Aug. 2, 1938.   K. D. WILLIAMS ET AL   2,125,324
METHOD OF AND COUPLING FOR PRESSURE PIPES
Filed April 1, 1935

KARL D. WILLIAMS
HUGO W. HIEMKE
INVENTORS

BY  *John J. Fitzgerald*
ATTORNEY

Patented Aug. 2, 1938

2,125,324

UNITED STATES PATENT OFFICE 2,125,324

METHOD OF AND COUPLING FOR PRESSURE PIPES

Karl D. Williams and Hugo W. Hiemke, Washington, D. C.

Application April 1, 1935, Serial No. 14,168

7 Claims. (Cl. 29—148.2)

(Granted under the act of March 3, 1883, as amended April 30, 1928; 370 O. G. 757)

This invention relates to an improved method of and coupling for pressure ferrous pipes, and has for an object to provide a very efficient, simple, inexpensive and durable coupling for such pipes which will not vary at the joint the area of the bore of the pipe and enable the pressure medium to flow through the joint with the same velocity and freedom from eddy currents inherent in the flow through the bore of the pipe. Such freedom from eddy currents and varied velocity in flow through the joint is highly advantageous, especially for fluids under pressure. Furthermore, in couplings of such pipe where recesses are formed within the bore, in addition to the foregoing disadvantages, accumulations of sediment are formed which are disadvantageous for many reasons, as well as tend in some cases to augment such eddy currents or otherwise impede the flow.

Further objects of this invention are to provide a coupling for ferrous pipe which will not tend to weaken, but rather strengthen, the pipe at the coupling; to avoid weakening the pipe as well as coupling by screw threads; to join the pipes, and/or fittings without screw threads and by welding, brazing or soldering; and to form the coupling substantially smooth and of uniform continuous bore with that of the pipe and smooth exterior contour of progressively increasing diameter as the joint is approached.

Other objects of the invention will appear to those skilled in the art from the following specification and claims.

Heretofore, the teaching in the art of pipe coupling for pressure fluid flow therethrough has been that ferrous pipe may not be flared at the ends after the same has been made of uniform diameter, but we have found that the same may be conveniently done with such pipe cut to any of the lengths in which the same may be required to be cut, and that a very simple, inexpensive and enduring joint of great strength may be made therewith.

In the drawing Fig. 1 is a longitudinal cross-sectional view through a portion of the integral continuous metallic coupling ring;

Our new and improved method of coupling pressure pipes will, for brevity and clearness, be described in connection with the general description of our invention.

Figure 1:
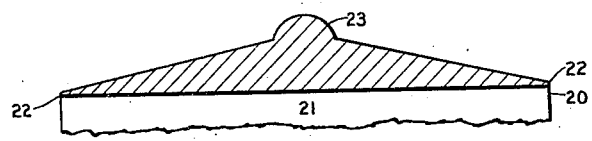
Figure 2:
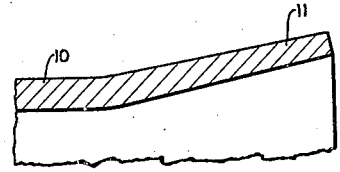
Fig. 2 is a longitudinal cross-sectional view of a portion of the end of a ferrous pipe formed for coupling in accordance with our invention.

The ends of ferrous pipe 10 to be joined are provided with an outward symmetrical flare 11 of uniform taper and in which the metal of the pipe is progressively thinned as the same approaches the end of the pipe, as more clearly shown in Fig. 2. This is most economically and conveniently done on the job or in the shop by inserting into the bore of the end of the pipe 10 to be joined the pilot 12 of a tool 13 having handle 14 provided with a preferably rounded outer end 15 and joined to pilot 12 by an integral body 16 having a conical exterior conforming to the taper of the flared portion 11 of the pipe to be joined, the smallest diameter of said conical surface being substantially that of pilot 12 and its largest diameter terminating in most instances in a shoulder 17 at the point of juncture with handle 14. The pilot 12 of tool 13 is inserted into the bore of each end of ferrous pipes to be joined together in accordance with our invention. The conical body portion 16 of tool 13 is then driven or pressed into the pipe by pressure or blows upon the end 15 until the outer edge of the same registers with either lines 18 or 19 formed upon the outer surface of conical body portion 16 near the largest diameter thereof. This results in outward flaring of the end of the ferrous pipe to be joined, as heretofore described.

Into the flaring ends 11 of the ferrous pipe to be joined in accordance with our invention is inserted a pipe thimble 20 having a bore 21 extending longitudinally therethrough, of the diameter of the bore of the pipe 10 to be joined. The thimble 20 is formed of a continuous integral unseparated and unperforated body of metal surrounding its bore 21, formed thickest at substantially the center of its length and tapering therefrom to opposite ends, with the largest diameter substantially in the center of the length of thimble 20, and its smallest diameter at its opposite ends where a relatively thin edge 22 is formed which merges into the bore of the pipe 10 to be joined together without disturbing the continuity of the uniform diameters of the bores of the pipe 10 and of the thimble 20.

This merger of the bores of ferrous pipe 10 and thimble 20 into each other without disturbing the continuity of such bores of equal diameter affords a uniform velocity of flow of the pressure medium through the pipe 10 and the bore of thimbles 20 joining the pipe together. This uniform velocity of flow is without turbulence, as well as eddy currents, which we have found are occasioned and augmented by recesses or projections in pipe joints. It has also been found that such turbulence and eddy currents in the flow of mediums under pressure in pipes occasions an electrolytic action upon the pipe and joint which induces or accelerates corrosion. While the sharp edges 22 at the opposite ends of each thimble 20 are liable to distortion or other damage in handling preparatory to use, and are objectionable for those reasons, it has been found that the same is advantageous when it is considered that the same avoids turbulence and/or eddy currents in the flow of pressure medium through the bore of the pipe and thimble 20, as well as avoids resulting electrolytic action and corrosion induced and/or excited thereby. The gradual tapers of the opposite ends of thimble 20 inward from its opposite thinned edges 22 furthermore enables the ends of pipe 10 to be joined to be outwardly flared as at 11 with progressively continuing tapers corresponding to their respective tapered ends of thimble 20 and which tapers progressively and symmetrically merge, at a substantial uniform rate, into the bore of pipe 10, as well as that of thimble 20.

Figure 3:
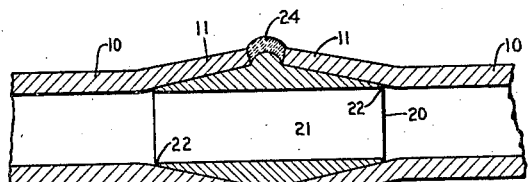
Fig. 3 is a central longitudinal view taken through a portion of the ends of two ferrous pipes coupled in accordance with our invention.

At substantially the center of its length each thimble 20 is provided with an annular integral external bead or series of projections 23 against whose opposite edges the inner edges of the flared ends 11 of pipes 10 engage. This engagement, as well as the degree of juxtaposition of the tapered bores of the flaring ends 11 of pipes 10 and the tapered outer surfaces of their thimble 20, is controlled by the indicia 18, 19 upon conical body 16 of the expanding tool 13. When a close fit between said tapering surfaces is desired, the tool 13 is forced or driven into the ends of pipe to be joined until the inner edge of the flared end 11 of pipe 10 registers with the line or indicating means 18, which is positioned on the conical portion of the tool 13 so as to obtain the contact of the whole inner surface of flaring end 11 of pipe 10 with the whole tapered exterior surface of, and the base of bead 23 on, thimble 20. This close or tight fit between said juxtaposed surfaces is found most advantageous in the instances we have so far encountered in practice of our invention where the flared ends 11 of pipe 10 are welded or brazed together. Such welding or brazing is indicated in Fig. 3, in which 24 indicates the welding or brazing fillet which surrounds the bead or projections 23 and extends between the juxtaposed ends of the flared portions 11 of pipe 10 joined together by our invention. In such welding or brazing more or less of the juxtaposed, as well as contacting, surfaces are joined together firmly with high efficiency to resist stresses and vibrations in pipe installation in static structures, as well as the substantially greater vibrational stresses arising in pipe installation in dynamic structures such as automobiles, vessels, and especially naval vessels.

Figure 4:
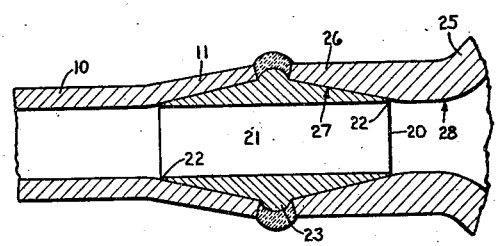
Fig. 4 is a longitudinal sectional view taken through a portion of a fixture and a portion of a pipe coupled thereto in accordance with our invention.
Figure 5:
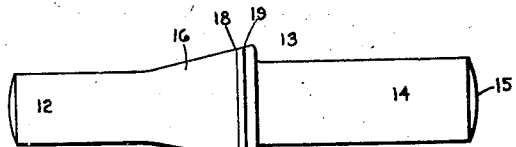
Fig. 5 is a plan view of a tool for flaring the ends of pipe to be joined in accordance with our invention.

Fig. 4 illustrates the same parts and practice as in Fig. 3, except that one of the pipes 10 of Fig. 3 is omitted and any suitable valve or fixture 25 is substituted therefor, whose pipe joint end 26 is provided by machining or otherwise with an inner tapering bore 27 corresponding to the tapered end of thimble 20, which tapers progressively and symmetrically merge with the bore 28 of valve or fixture 25, as well as the bore 21 of thimble 20. At this point of merger no turbulence or eddy currents in the flow of the pressure medium is excited or induced for the reasons and objects stated in connection with the disclosure of Fig. 3. Otherwise, the disclosure of Fig. 4 is the same as that of Fig. 3.

Figure 6:
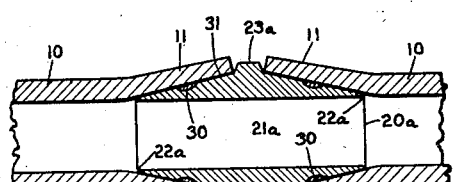
Fig. 6 is a longitudinal view through portions of pipes joined together with solder in accordance with our invention.

Thus far in the disclosure of our invention the same has been described as being adapted more especially to the concept of our invention when the joint is to be secured by welding or braking. Fig. 6 discloses the structural adaptation to the concept of our invention of the solder securement of the joint. While it discloses merely the joining together of pipe, similar to Fig. 3, it will be understood, by those skilled in the art, that it may without modification be employed to secure a pipe end to a valve or other fitting, substantially as indicated in Fig. 4. Otherwise than herein described, the parts shown in Fig. 6 are the same in structure and in function as those parts disclosed in Figs. 3 and 4.

The thimble 20a, Fig. 6, has all the structural and functional features of the thimble 20 heretofore described, and in addition thereto the oppositely tapered peripherical surfaces thereof are provided each with an annular recess 30. In flaring the ends 11 of pipe 10 to be joined in accordance with Fig. 6, the tool 13 is driven or forced therein until the inner edge of the flaring end of the pipe registers with the indication 19 on tool 13. This insures a slightly greater end terminal diameter in the taper of the flaring end 11 of pipe 10 over that of the corresponding end of the thimble 20a, so that when the inner edge of the flaring end 11 of pipe 10 contacts with the base of the bead 23 there exists between such juxtaposed tapered surfaces a relatively thin annular space such as has been found to produce and/or invite capillary attraction substantially facilitating the flow of molten solder in and about the joint, filling the capillary attraction space and the annular recess 30, and firmly and efficiently uniting the ends of pipe and/or fittings to fittings, and/or pipe to fittings so durably as to resist stresses and vibrations such that joint failures have been occasioned even in threaded couplings.

It will furthermore be appreciated, especially by those skilled in the art, that joints made in accordance with our invention are substantially stronger than the normal strength of the pipe or ends of fittings joined together. This is due to a number of causes which we have so far ascertained, including, the increased strength afforded the flared pipe end by the cold working thereof, as well as by the increased diameter thereof, also by the relatively long thimbles 20, 20a, reinforcing the strength of the flaring ends of the pipe throughout the whole extent of such flaring ends, so that the inherent rigidity of the continuous, integral, unseparated and unperforated thimbles have a substantial length of bearing upon each of the flaring ends of the pipe and substantially resist lateral and other vibrational stresses, as well as all other stresses at the point of the juxtaposed ends of the pipe and distributing all such stresses through the length of each thimble.

It will be further appreciated that the joint, in accordance with our invention, has a symmetrical exterior surface gradually approaching its largest diameter at a point between the pipe ends, which diameter is no more than, if as much as, that of a wiped joint between the ends of lead pipe.

In connection with Fig. 6 each thimble 20a may be coated with solder and the annular recess 30 filled therewith, either in the factory or in the field, preparatory to making the joint. In this case after cleaning, and/or coating with solder, of the flaring ends and inner flaring surfaces of the pipe ends 11 in accordance with soldering practice, the thimble 20a may be inserted into the flaring bores of pipe ends 11 and there held while heat is applied to said flaring ends 11 and, consequently, to the thimble 20a, until the solder becomes molten, when additional solder may be placed between the pipe ends 11 and about the fillet or series of projections 23, whereupon the union may be permitted to cool. In cooling it will be observed that in the structures in each of Figs. 3, 4 and 6, the thinnest point of the joined pipe within the joined area is at thimble ends 22, 22a through the wall of pipe 10, and that the thickest part of such joint is from the bore of thimble 20, 20a in the region of the bead or projections 23, 23a. The functional advantage of said difference in thickness is furthermore attained by our invention, as follows:

In the disclosure of Fig. 6 the solder joint will first cool to the point of non-fluidity substantially at the thinnest points of said joint, which is substantially at the opposite ends 22a of thimble 20a. This, with said capillary attraction space, as well as said annular recess 30, will insure a continuous body of solder without voids therein extending continuously between said ends 22a as well as between the flaring ends 11 of the pipe 10.

Instead of the pre-coating of thimble 20a, Fig. 6, with solder, the same with the ends 11 of pipe 10 may be prepared for solder in the usual way and assembled, after which they may be heated and solder applied between the juxtaposed ends of the pipe and about the fillet 23a until a firm solder union is obtained thereby, in the manner heretofore stated.

Said advantages relative to the disclosure of Fig. 3 are somewhat different, due to the different characteristics of welding or brazing, including the higher heat required. This higher heat stores a greater number of heat units in the thicker metal in the region of the bead 23, and progressively less heat units as the metal of the flaring end 11 of pipe 10 and of the tapered end of thimble 20 progressively becomes thinner. Since the area of exchange of this heat to the surrounding atmosphere remains fairly constant, it will be appreciated that less of the welding heat will be at the thinnest point 22 where the same is farthest from the welding fillet 24, with the heat thereof progressively lessening as said point 22 is approached, and that the heat at point 22 will not only be lower but will cool substantially quicker than the welding fillet 24. This affords progressively less and less heat deterioration of the cold working characteristics of the flaring end 11 of pipe 10 as the diameter of said flare decreases. This progressive condition has been found of substantial advantage in joints of all of the metals whose desirable characteristics may be enhanced by cold working. The same has also been found to be desirable and advantageous in the joining of pipes of steel alloys having a carbon content of higher than substantially .08. These alloys are numerous and include austenitic stainless steel, wherein the carbon, when afforded time and temperature facilities requisite therefor, tend to migrate to the grain boundaries, carrying other constituents therewith. Said migration produces nonhomogeneity in the metal, occasioning undesirable conditions sometimes called carbide precipitation, also lowering the normal corrosion resistance of the alloy, as well as tending to brittleness where the carbon content is high. The quicker cooling of the welding or brazing heat at 22 insures, with its distance from the welding fillet 24, and the intermediate temperature drop, that any undesirable degree of migration or carbide precipitation that may be occasioned will be well within the flaring length of the end 11 of pipe 10 which is strengthened, covered and protected from the through flowing pressure fluid by the thimble 20. Thereby any such resulting disadvantageous condition does not practically affect the function, durability or resistance of the joint made in accordance with our invention in all the many conditions which we have encountered in practice.

It will be appreciated from the foregoing that the acts requisite to the practice of our improved method comprise the flaring of the ends of pipe and/or connections to a progressive continuous taper with the walls thereof of progressively thinner outer wall as the end is approached; inserting in the flaring ends to be joined a correspondingly oppositely tapered thimble having a bore therethrough corresponding to the bore of the pipe and/or connections to be joined together, and securing the parts together by welding or soldering; and that other acts incident thereto may be readily understood by those skilled in the art from the foregoing specification including those involving the heat transfer and the avoidance of turbulence, eddy currents, and the advantages obtained thereby.

We have also found that the pipe ends may as advantageously be flared in the shop where power is available by a roller expanding tool which has no expanding rollers in the pilot portion of the tool, but only in the conical portion of the tool.

The invention described herein may be manufactured and used by or for the Government of the United States of America for governmental purposes without the payment of royalties thereon or therefor.

Having now so fully described our invention that others skilled in the art may therefrom make and practice said invention, what we claim is:

1. The method of joining ferrous pipe for conveying pressure mediums comprising flaring outward at least one unheated end of the normally uniform bore of a ferrous pipe with a uniformly progressing taper and thinness of wall from its bore to its outer end, inserting in each flared end bore conforms to and uninterruptedly joins that of the pipes, securing the pipe and member with solder by flaring sufficiently the juxtaposed surfaces of said flared portions to form a capillary attraction space therebetween, and by cooling the solder heat below fluidity first near the smallest diameters of said juxtaposed flared surfaces.

2. In a coupling for ferrous pipe the combination of a pair of ferrous pipes whose adjacent ends are outwardly cold-flared with a relatively long slow taper of definite length progressing symmetrically from the bore of the pipe outward, the metal of the flared portions of each pipe being thinner progressively as the taper extends outward from the normal body of the pipe; a thimble of integral, continuous and unperforated metal having a bore extending longitudinally therethrough conforming to, and merging uninterruptedly into, the bore of the pipe, said thimble having at opposite ends a tapered exterior conforming in length and degree of taper to the interior tapered surface of the flaring end of the pipe to be occupied thereby in firm physical contact, there being a space between the adjacent ends of the pipe so occupied by said thimble; and means for securing the pipe and thimble together.

3. The structure of claim 2 further characterized by the means comprising molten metal at least a portion of which occupies said space.

4. The structure of claim 2 further characterized by the means comprising a welding deposit securing together the flared ends of the pipe and by the length and progressive thinness of each of the tapered portions being such that the welding heat may not harmfully change the characteristics of the pipe except in an intermediate portion of the extent of the tapered portions.

5. In a pipe coupling the combination of a pair of ferrous metallic pipes whose adjacent ends are outwardly flared with a relatively long taper of definite length progressing symmetrically from the bore of the pipe outward, the metal of the flared portions of each pipe being thinner progressively as the taper extends outward from the normal body of the pipe; a thimble of integral, continuous, and unperforated metal having a bore extending longitudinally therethrough and conforming to, and merging at each end uninterruptedly into, the bore of the pipe, said thimble having at opposite ends a tapered exterior conforming in length and degree of taper to the interior tapered surface of the flaring ends of the pipe to be occupied thereby with a relatively thin substantially capillary attraction space extending between and at least throughout a substantial extent of the juxtaposed tapered surfaces of the pipe and thimble, there being a space between the adjacent ends of the pipe so occupied by said thimble, and said thimble being provided in said last named space with an outward projection against whose opposite surfaces the juxtaposed ends of the pipe are adapted to contact to maintain said capillary attraction spaces, whereby the pipe may be secured to the thimble by solder occupying said capillary attraction spaces.

6. The structure of claim 5 further characterized by a space extending at least about a substantial annular portion of each tapered portion of the thimble.

7. The structure of claim 2 further characterized by the wall of the coupling at opposite ends of the thimble being thinnest whereby the solder may first cool to non-fluidity substantially at said opposite ends of the thimble.

KARL D. WILLIAMS.
HUGO W. HIEMKE.